United States Patent
Messerschmidt et al.

(10) Patent No.: US 8,277,127 B2
(45) Date of Patent: Oct. 2, 2012

(54) BEARING CAGE

(75) Inventors: Rainer Messerschmidt, Duesseldorf (DE); Henri Van Der Knokke, Niederwerrrn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 155 days.

(21) Appl. No.: 12/863,952

(22) PCT Filed: Jan. 17, 2009

(86) PCT No.: PCT/DE2009/000046
§ 371 (c)(1),
(2), (4) Date: Jul. 28, 2010

(87) PCT Pub. No.: WO2009/092351
PCT Pub. Date: Jul. 30, 2009

(65) Prior Publication Data
US 2010/0310204 A1   Dec. 9, 2010

(30) Foreign Application Priority Data
Jan. 22, 2008 (DE) .......................... 10 2008 005 376

(51) Int. Cl.
*F16C 33/46* (2006.01)
*F16C 33/51* (2006.01)

(52) U.S. Cl. ......... 384/572; 384/470; 384/574; 384/579

(58) Field of Classification Search .................. 384/418, 384/522, 548, 559–560, 563–565, 572, 574, 384/470, 579
See application file for complete search history.

(56) References Cited

U.S. PATENT DOCUMENTS

| 1,422,162 A | * | 7/1922 | Zahn | 384/564 |
| 1,438,654 A | * | 12/1922 | Leon | 384/574 |
| 1,458,150 A | | 6/1923 | Rice et al. | |
| 2,015,872 A | * | 10/1935 | Ruske | 384/568 |
| 2,391,272 A | * | 12/1945 | Rose | 384/419 |
| 2,561,105 A | * | 7/1951 | Forkey | 384/568 |
| 2,565,070 A | | 8/1951 | Foley | |
| 4,561,703 A | * | 12/1985 | Dabringhaus | 384/44 |
| 5,038,921 A | * | 8/1991 | Hoppmann et al. | 198/779 |
| 5,474,389 A | * | 12/1995 | Garcia | 384/572 |
| 6,390,524 B1 | * | 5/2002 | Plesh, Sr. | 295/39 |
| 6,464,062 B1 | * | 10/2002 | Wendt et al. | 193/35 R |
| 7,168,546 B2 | * | 1/2007 | Plesh, Sr. | 193/35 R |
| 7,597,481 B2 | * | 10/2009 | Scherpf | 384/572 |

FOREIGN PATENT DOCUMENTS

| DE | 3418621 A1 * | 11/1985 |
| FR | 500 748 X | 3/1920 |
| JP | 2003184892 X | 7/2003 |
| JP | 2006 071063 X | 3/2006 |

* cited by examiner

Primary Examiner — Marcus Charles
(74) Attorney, Agent, or Firm — Lucas & Mercanti, LLP; Klaus P. Stoffel

(57) ABSTRACT

A bearing cage for large radial or axial roller bearings, which has two axially opposed, circular ring-shaped side washers held at a distance to each other by connecting elements, and roll-shaped rolling elements disposed between the side washers which have bolt-like elements on the faces thereof. A side washer on at least one side of the rolling element has radial recesses into which the bolt-like elements protrude. At least one securing element suitable for holding the bolt-like elements in the area of the radial recesses in the assembled state is provided. Shaped elements that can each be introduced at least partially into the radial recesses of the side washer are provided as the securing element. This construction achieves easy assembly and disassembly of the housing, allowing high flexibility in repairing a roller bearing so equipped.

7 Claims, 3 Drawing Sheets

BEARING CAGE

CROSS REFERENCE TO RELATED APPLICATIONS

This application is a 371 of PCT/DE2009/000046 filed Jan. 17, 2009, which in turn claims the priority of DE 10 2008 005 376.7 filed Jan. 22, 2008, the priority of both applications is hereby claimed and both applications are incorporated by reference herein.

FIELD OF THE INVENTION

The invention relates to a bearing cage, for example, for larger radial or axial roller bearings, having two axially oppositely located circular ring-shaped side disks, which are held by means of connecting elements at a distance from each other, having roller-shaped rolling bodies arranged between the side disks, which rolling bodies have bolt-like elements arranged at their end faces, wherein at least on one axial side of the rolling bodies a side disk with radial recesses is provided, into which recesses the bolt-like elements protrude and wherein at least one securing means is provided, which, in the assembled state, is suitable for holding the bolt-like elements in the areas of the radial recesses.

BACKGROUND OF THE INVENTION

Roller bearings equipped with such bearing cages have a relatively high load-bearing capacity because a large number of roller bodies can be mounted in the bearing cages. Simultaneously, a simplified assembly of the bearing cages and, thus, of the roller bearings is possible.

A bearing cage of the generic type is described in U.S. Pat. No. 1,458,150. This bearing cage has two side disks, one of which has a slightly smaller outer diameter than the other. In the smaller side disk, radially outwardly situated recesses are inserted which are distributed uniformly over the circumference of the side disk. Bolt-like elements of roller-shaped rolling bodies protrude into these recesses, which rolling bodies are located between the side disks. The other side disk has bores into which bolt-like elements also protrude from the other axial side of the rolling bodies. As a result, the rolling bodies arranged between the side disks are held at a defined distance from each other. For securing, the smaller side disk is radially surrounded by a circular ring-shaped securing means which axially and radially covers, in the assembly position, the openings of the radial recesses.

U.S. Pat. No. 2,565,070 discloses a bearing cage which has two side disks with radially outer recesses. The roller-shaped rolling bodies located between the side disks have bolt-like integrally formed elements which protrude into the recesses of the side disks.

OBJECT OF THE INVENTION

Starting from the solutions of the known prior art, the invention is based on the object of introducing an alternative bearing cage which can be assembled and disassembled especially simply.

DESCRIPTION OF THE INVENTION

The invention is based on the finding that the configuration of the mentioned securing means for holding the bolt-like elements integrally formed with the rolling bodies have a large influence on the flexibility with respect to the assembly and disassembly of the bearing cage.

In accordance with the features of the preamble of the main claim, the invention starts from a bearing cage, for example, for larger radial or axial roller bearings, with two axially oppositely located circular ring-shaped side disks, which are held by means of connecting elements at a distance relative to each other, with roller-shaped rolling bodies arranged between the side disks, which rolling bodies have bolt-like elements at the end faces thereof, wherein at least on one axial side of the rolling bodies a side disk with radial recesses is provided, into which the bolt-like elements protrude and in which at least one securing means is provided, which, in the assembled state, is suitable for holding the bolt-like elements in the area of the radial recesses.

For solving the mentioned object, it is also provided that form elements are provided as securing means, which can each be inserted at least partially into the radial recesses of the side disk. As a result of this configuration, an easy assembly or disassembly capability of the bearing cage is achieved, wherein simultaneously also a high flexibility is achieved. Thus, the individual rolling bodies can separately be assembled (secured) or disassembled (released) by releasing or inserting the form elements serving as securing means. As required, it is also possible to exchange only individual, for instance damaged, rolling bodies or safety elements which leads to cost reduction in the maintenance.

A first advantageous development of the concept of the invention provides that the form elements serving as securing means are, in the assembled state, preferably fastened by means of frictional engagement and/or by material engagement in the radial recesses. In this manner, no additional fastening means are necessary for the form elements and the safety of the connection is increased. Alternatively, the fastening of the form elements in the recesses, however, can also be effected by magnetic force when suitable materials are selected.

In accordance with a second advantageous embodiment of the invention, it is provided that the radial recesses of the side disk can be filled essentially completely with positive engagement with the form element serving as securing means. This configuration makes it possible to achieve a good purchase of the bolt-like elements of the rolling bodies.

In a preferred development, a particularly good purchase can be achieved, if advantageously the form elements serving as securing means have, at their ends facing the bolt-like elements, semicircular-shaped recesses and the recesses of the side disk have, at their ends facing the bolt-like elements, also semicircular-shaped recesses, such that in the assembled state of the form elements serving as securing means, the recesses of these form elements and the recesses of the side disk complement each other to form a circle.

In order to achieve a structural configuration of the bearing cage which is as compact as possible and, thus, also the structural configuration of the roller bearing, it is extremely advantageous when the form elements serving as securing means are, in the assembled state, flush with the surface of the side disk.

When, in accordance with another advantageous development of the invention, a side disk with radial recesses is provided on each axial side of the roller bodies, into which recesses the bolt-like elements of the roller bodies protrude and are secured with the form elements serving as securing means are secured, an especially light, optimum assembly capability of the bearing cage including the roller bodies in a roller bearing can be achieved. The roller-shaped rolling bodies can then be inserted with their bolt-like elements into the side disks from the top or from below (depending on the type of construction of the side disks, i.e., the radial alignment of the recesses), and, subsequently, secured by means of the form elements serving as securing means. Another type of bearing cage assembly results from constructing the inner ring of the bearing at least on one side without axial side because consequently, the bearing cage can be completely preassembled with the rolling bodies outside of the bearing and then be slid onto the inner ring of the bearing.

It may be advantageous if the recesses in the side disk are arranged so as to be radially arranged outside. In the same manner, it may be advantageous to arrange the recesses in the side disk on the radially inner side.

Finally, for reducing the plurality of parts and the required assembly effort, it is very advantageous if the bolt-like elements of the rolling bodies are connected in one piece with the roller-shaped rolling bodies.

BRIEF DESCRIPTION OF THE DRAWINGS

A preferred embodiment of the bearing cage, constructed in accordance with the invention, is described in more detail in connection with the enclosed drawings. In the drawing.

DETAILED DESCRIPTION OF THE DRAWINGS

Figure 1:
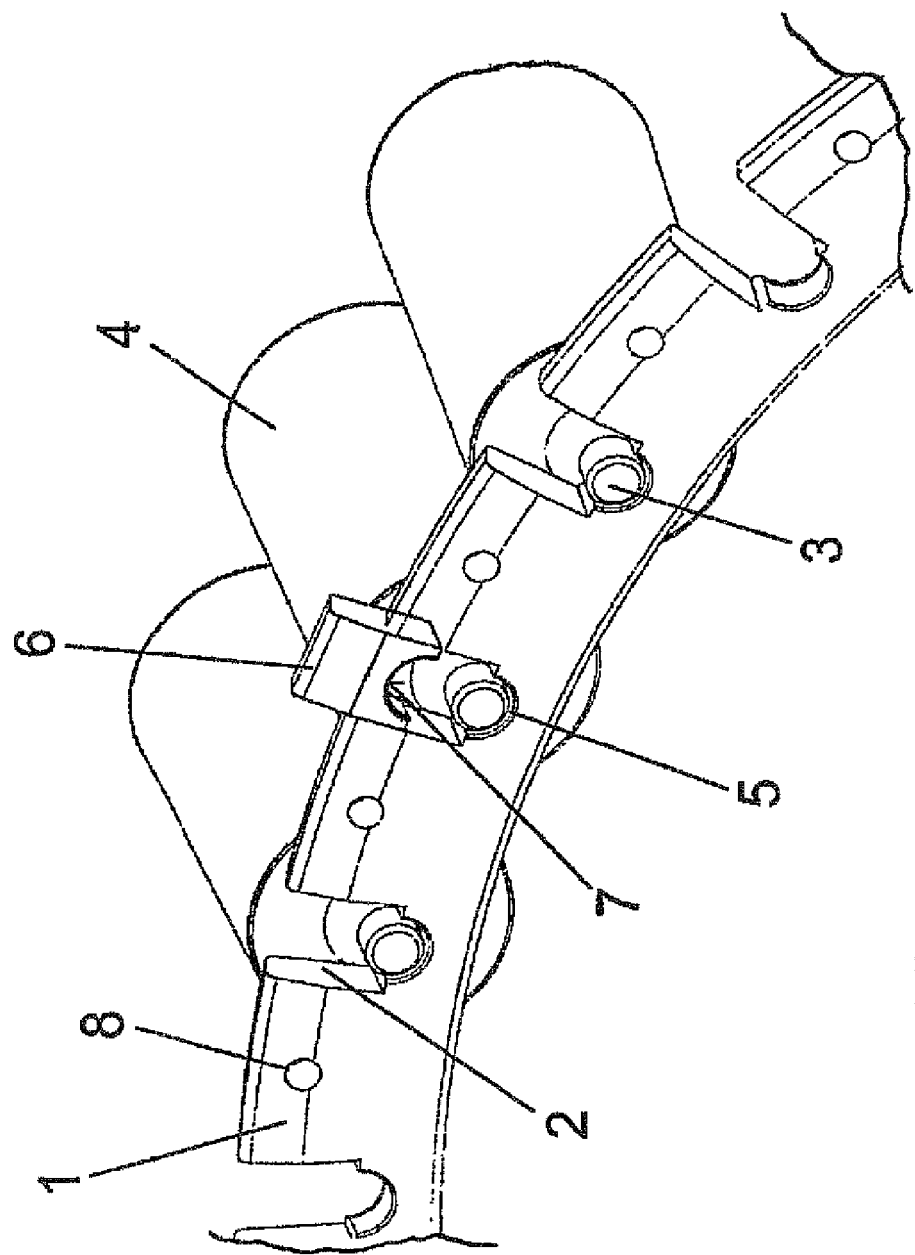
FIG. 1 shows a perspective illustration of a part of the bearing cage according to the invention with a form element serving as a safety means, wherein the bearing cage is only partially mounted.
Figure 2:
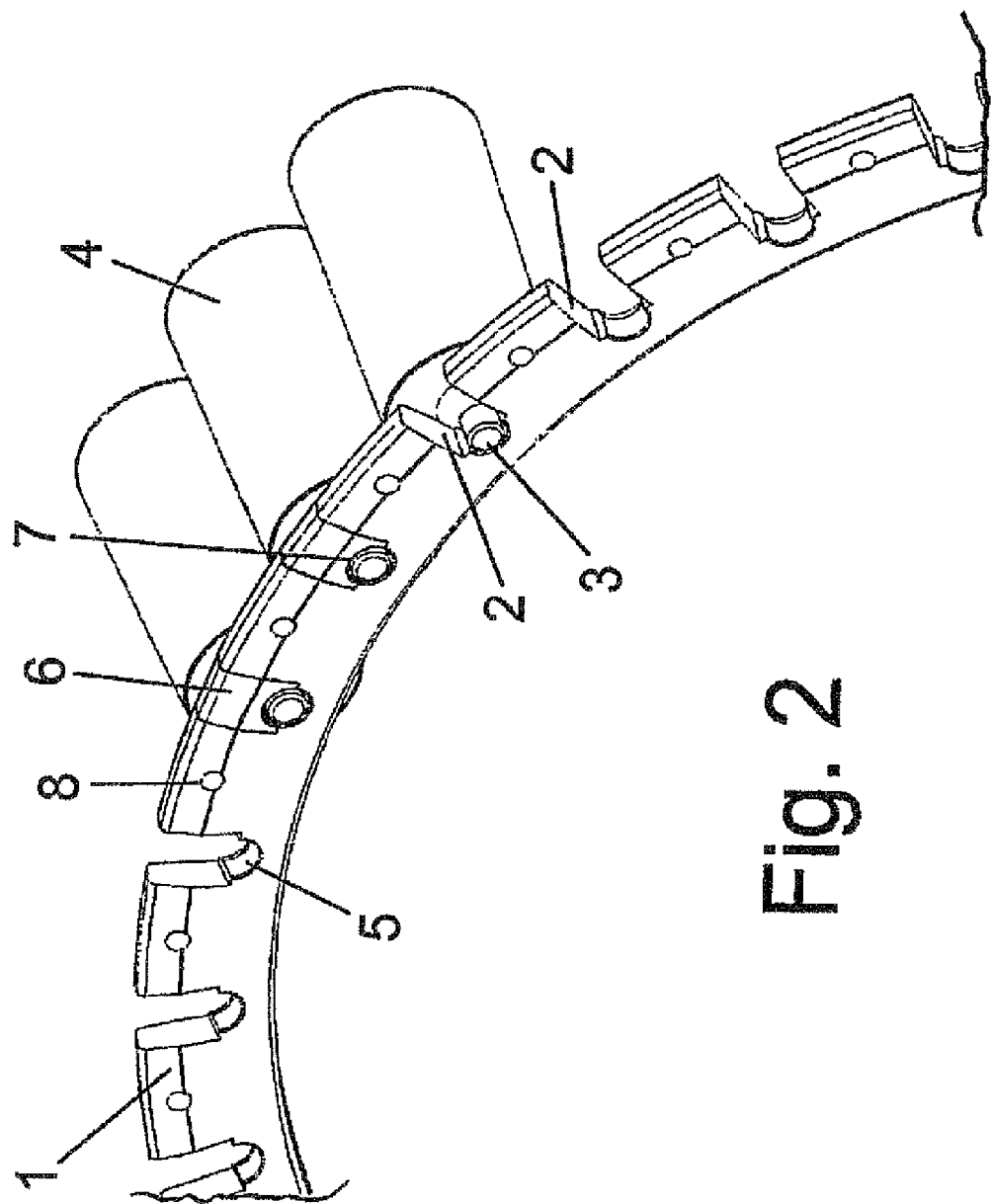
FIG. 2 shows a perspective illustration of a portion of the bearing cage according to the invention, wherein the bearing cage is only partially mounted, with two form elements serving as securing means.

Initially, reference is made to FIGS. 1 and 2. In these Figures, a side disk 1 is apparent which is only partially illustrated. The side disk 1 is provided with radially outwardly arranged recesses 2, into which the bolt-like elements 3 protrude. The bolt-like elements 3 are at the end faces thereof in one piece connected with roller-shaped cylindrical roller bodies 4. Moreover, it is illustrated that the recesses 2 extend initially rectangularly from the radial outer end of the side disk 1 in the direction of the radial inner end of the side disk 1 and have at their end facing the bolt-like element 3 an approximately centrally aligned semicircular recess 5. Placed into these recesses 5 are the bolt-like elements 3.

Furthermore, a form element 6 serving as a securing means is shown, which can be inserted from the top into the recess 2 and is also provided at its end facing the bolt-like element 3 with an essentially centrally aligned semicircular recess 7.

Moreover, axially aligned holes 8 can be seen in the side disk 1, which serve as receptions of rod-shaped connecting elements, not shown, which rod-shaped elements, in the assembled state, keep a second side disk, not shown, at a distance from the side disk 1.

Two form elements 6 serving as safety means are illustrated in FIG. 2, which form elements 6 are completely inserted into the recesses 2, so that the already mentioned recesses 5 and 7 completely radially surround the bolt-like element 3.

Figure 3:
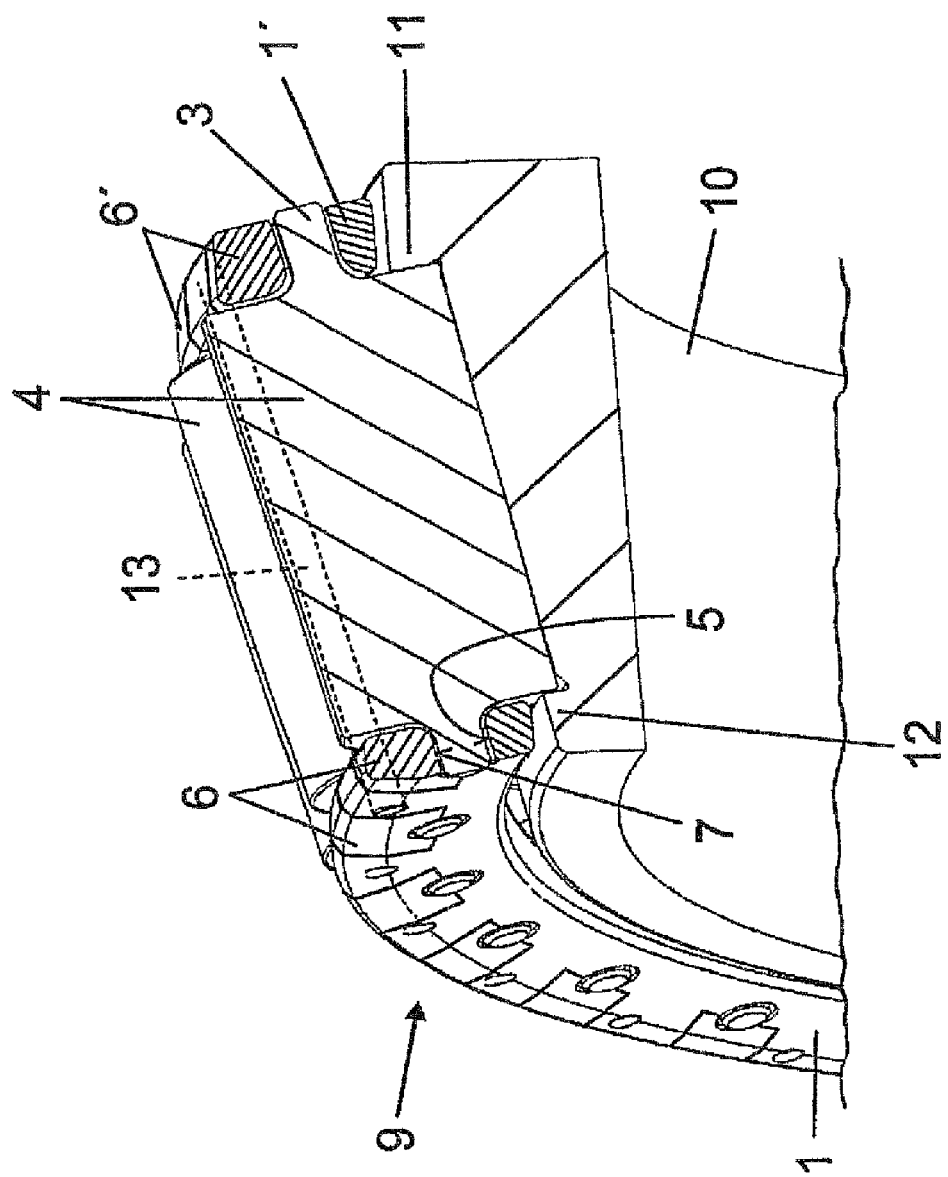
FIG. 3 is a perspective illustration of the bearing cage according to the invention in a longitudinal sectional view, wherein the bearing cage is mounted on an inner ring of a roller bearing.

FIG. 3 shows a completely mounted bearing cage 9 in a longitudinally sectioned perspective view, wherein the bearing cage 9 including its rolling bodies 4 is mounted on an inner ring 10 of a bearing. The inner ring 10 has axial sides 11 and 12 which are integrally connected to the inner ring 10, between which sides the rolling bodies 4 are guided. Moreover, a second circular ring-shaped side disk 1' can be seen, with form elements 6', likewise serving for securing, wherein the side disks 1 and 1' are held at a distance from each other by means of rod-shaped connecting elements 13 which are indicated in broken lines. It is easily recognizable how the bolt-like elements 3 are secured in the side disks 1 and 1' by the form elements 6, 6'.

The assembly of the bearing is carried out in a simple manner by preassembling the side disks 1, 1' by means of the connecting elements 13 and subsequently pushing them onto the inner ring 10. Subsequently, the rolling bodies 4 are placed piece by piece from the top into the recesses 5 and are secured by inserting the form elements 6 serving as securing means into the recesses 6. In this context, the width of the form elements 6 or 6' is selected preferably in such a way that the elements remain as a result of frictional engagement in the recesses 2. Finally, it is only necessary to slide on an outer ring of the bearing which has not yet been illustrated. A replacement of individual rolling bodies 4 or form elements 6 or 6' is easily possible at any time.

REFERENCE NUMERALS 1, 1' Side disk
2 Radial recesses in the side disk
3 Bolt-like elements
4 Roller-shaped rolling bodies
5 Semicircular-shaped recess
6, 6' Form elements serving as securing means
7 Semicircular-shaped recess in form element 6, 6'
8 Hole in the side disk 2
9 Bearing cage
10 Inner ring of the rolling bearing
11 Bearing side of the inner ring
12 Bearing side of the inner ring
13 Rod-shaped connecting element

The invention claimed is:

1. A bearing cage for radial or axial roller bearings, comprising:
   two circular ring-shaped side disks which are located axially opposite each other;
   a plurality of connecting elements holding the two circular ring-shaped side disks at a distance relative to each other; and
   a plurality of roller-shaped rolling bodies arranged between the side disks, the rolling bodies having at end faces thereof bolt-like elements, the bolt-like elements being connected in one piece with the roller-shaped rolling bodies,
   wherein at least one of the two circular ring-shaped side disks has radial recesses into which the bolt-like elements of the roller-shaped rolling bodies protrude, and in which at least one securing means is provided which, in an assembled state, holds the bolt-like elements in the radial recesses, and
   wherein the securing means are form elements, which form elements are at least partially insertable into the radial recesses of the side disk over the bolt-like elements to secure the bolt-like elements within the radial recesses.

2. The bearing cage of claim 1, wherein the form elements serving as securing means are fastened in the radial recesses.

3. The bearing cage of claim 2, wherein the form elements serving as securing means make it possible to fill out the radial recesses of the side disk essentially completely in a positively engaging manner.

4. The bearing cage of claim 1, wherein the form elements serving as the securing means, have at ends facing the bolt-like elements semicircular recesses, the recesses of the side disk have at ends facing the bolt-like elements also semicircular recesses, such that, in the assembled state, the form elements complement the recesses of the form elements and the recesses of the side disk to form a circle.

5. The bearing cage of claim 1, wherein the form elements serving as securing means are arranged, in the assembled state, to be flush with the surface of the side disk.

6. The bearing cage of claim 1, wherein on each axial side of the rolling bodies a side disk with radial recesses is provided into which recesses the bolt-like elements of the rolling bodies protrude, and which are secured with a form elements serving as securing means.

7. The bearing cage of claim 1, wherein the recesses in the side disk are arranged radially outside.

* * * * *